United States Patent [19] [11] 3,901,101
McGavern [45] Aug. 26, 1975

[54] TORSIONAL VIBRATION DAMPERS
[75] Inventor: Sanford A. McGavern, Indianapolis, Ind.
[73] Assignee: Wallace-Murray Corporation, New York, N.Y.
[22] Filed: May 15, 1974
[21] Appl. No.: 470,321

[52] U.S. Cl. .................................. 74/574; 188/1 B
[51] Int. Cl. ........................................... F16f 15/12
[58] Field of Search ........... 74/574; 64/1 V; 188/1 B

[56] References Cited
UNITED STATES PATENTS
3,285,097   11/1966   O'Connor ............................. 74/574
3,670,593   6/1972    Troyer .................................. 74/574
3,769,813   11/1973   Okada ................................. 64/1 V X Primary Examiner—Samuel Scott
Assistant Examiner—F. D. Shoemaker
Attorney, Agent, or Firm—Thomas J. Greer, Jr.

[57] ABSTRACT

A torsional vibration damper for attachment to a torsionally vibrating element, such as the crankshaft of an internal combustion engine. The fatigue life of the damper elastomer is improved through internal reinforcement with a fabric to inhibit spreading of fatigue cracks. The dynamic spring rate, in compression, is increased through the use of fabric inserts. The temperature of the elastic member may also be lowered by the use of thermally conductive fabric. Such a material assists in conducting heat from the center of the elastic member to the sides of the damper where it may be more readily dissiptated.

9 Claims, 4 Drawing Figures

PATENTED AUG 26 1975    3,901,101

TORSIONAL VIBRATION DAMPERS

This invention relates to torsional vibration dampers of the type illustrated in U.S. Pat. No. 3,077,123 to Katzenberger.

Torsional vibration dampers are used in mechanical installations wherein a shaft is subject to rotational acceleration or deceleration impulses. They are widely employed in the automotive industry for reciprocating internal combustion engines on passenger and larger vehicles wherein the vibrations of the drive or crankshaft are primarily occasioned by torque impulses to the shaft from the power strokes of the pistons in the various cylinders. Such devices also exhibit utility in a rotary type internal combustion engine wherein there are also discrete applications of torque to the drive shaft. A common form of such damping devices is illustrated in the noted Katzenberger patent and may be described in general as an outer or inertia member in the form of a ring or annulus of some significant mass. The inner portion of the ring is attached to an elastomer annulus which, in turn, is secured to a hub or other element attached to the rotating drive shaft. As the drive shaft is turning, each incremental application of torque, as is occasioned by rapid fuel combustion in a cylinder, results in a slight acceleration of the metal adjacent the crank arm. When the metal recovers, due to its natural elasticity or resilience, it rotates slightly in the opposite direction. These two forces result in a torsional vibration in the shaft. During the operation of a typical internal combustion engine, the shaft is continuously turning at a high rate while simultaneously executing torsional vibrations of rather small angular magnitude. In a typical instance of torsional vibration, the engine crankshaft turns at a rate to 3,000 r.p.m. and simultaneously executes angular vibrations of an amplitude of one-fourth to one degree at a frequency of 150 to 250 cycles per second.

Such torsional vibrations, if uncontrolled, often cause failure of the drive shaft, particularly where one of the resonant frequency modes of the shaft coincides with the particular firing frequency of the engine. A torsional vibration damper of the type shown in the noted Katzenberger patent and to which this invention is concerned serves effectively to convert the torsional vibration energy into heat energy in the elastomer. The heat built up in the elastomer during operation raises the temperature of the elastomer. It is already known in this art to provide metallic sleeve insert members in the elastomer to conduct heat away from the interior thereof to the outside to thereby improve operation.

It has been observed that operation at rather high temperatures, such as in the range of 250–350°F., results in failure or rupture of the elastomer and it is believed that much if not all of such failure is due to the propagation of small fractures or cracks in the elastomer as a result of weakening of the elastomer due to high temperatures. This temperature increase, due to hystersis in the rubber, is made more critical by the normal positioning of the torsional damper at the front of the engine crankshaft, into the hot blast of air coming from a radiator.

In a normal life cycle the damper elastic member is expected to operate about 5,000 engine operating hours, and to go through 3 to 4 billion flexing and energy dissipation cycles in that period of time. The elastomers best suited to withstand temperature extremes encountered are relatively weak when subjected to continued flexing and this invention relates to methods of improving elastomer fatigue life through internal reinforcement of the elastic element with a fabric to inhibit spreading of fatigue cracks.

According to the practice of this invention, thermal fatigue failure due to the spreading of fissures or cracks in the elastomer is inhibited by use of a fabric molded or cast into the elastomer member. When a thermally conductive fabric is employed, the additional action of conducting heat away from the elastomer interior is realized.

Figure 1:
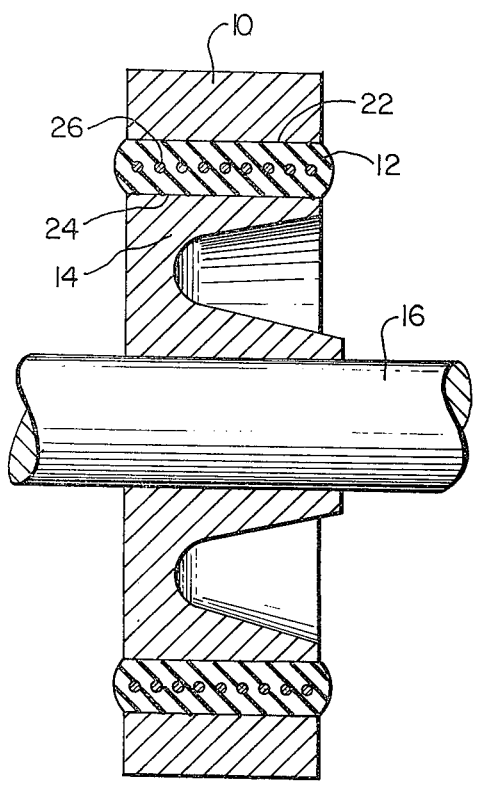
FIG. 1 is a partial cross-sectional view of a torsional vibration damper formed in accordance with the present invention.

Referring now to the drawings, the numeral 10 denotes an inertia member in the general form of an annulus or ring which is bonded and/or precompressed at its innermost surface to a ring or annulus of elastomer denoted by the numeral 12. The elastomer may be a silicone rubber, or the types SBR or EP or others. The radially innermost portion of the rubber annulus 12 is bonded or precompressed between the inertia member 10 and hub 14 carried by rotatable shaft 16 subject to torsional vibration. The shaft may be, for example, the crankshaft of an internal combustion engine. The bond, if used, between the elastomer and the two mentioned elements is denoted, respectively, by the numerals 22 and 24. The numeral 26 denotes a fabric placed circumferentially in the elastomer.

Figure 2:
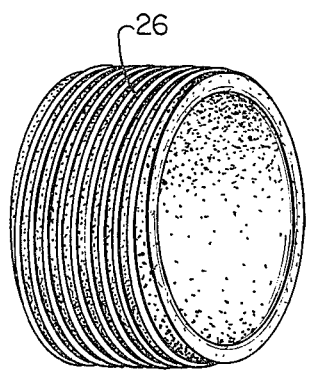
FIG. 2 is a partially schematic view illustrating an intermediate stage in the manufacture of an elastomer insert for the damper of FIG. 1.

In FIG. 2 of the drawings, the fabric 26 is shown as running circumferentially around an elastomer sleeve. The fabric may be of nylon strands 0.016 inch in diameter and spaced apart from each other by an equal distance. The nylon strands, such as nylon 66, are coated and calendared with a natural rubber. The fabric has no fill threads, only warp threads which may be spaced apart by short, discontinuous fibers of a plastic such as nylon, oriented radially of the strands (at right angles to the strand surface) commonly known as flock. In one method of manufacture, a layer of elastomer is now wrapped over the sleeve and strands, sandwiching the strands. The assembly is placed in a compression mold where heat and pressure form the fabric-reinforced annulus 12, all in a manner well known. The member 12 may be radially compressed and then inserted into the annular gap between the inertia and hub members, or adhesive bonding may be employed, both as well known in the art.

It has been determined that the radial spring rate for torsional dampers thus formed increases approximately 100% for each fabric layer, although the shear or torsional rate is not changed. In one torsional damper formed in a manner similar to that above described, the sample performed satisfactorily through 375°F. at which time it failed, the rubber coating cement on the nylon 66 threads reverting and losing its adhesion. A relatively few cracks had started at the corners of the assembly but had not proceeded into the elastomer member 12 beyond the fabric, which then stopped the tear growth. By comparison, a similar damper tested under the same conditions failed at 275°F. without fabric 26.

Figure 3:
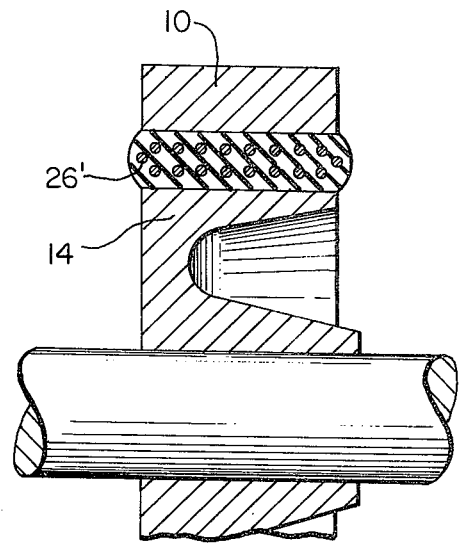
FIG. 3 is a view similar to FIG. 1 and illustrates a second embodiment of the invention.
Figure 4:
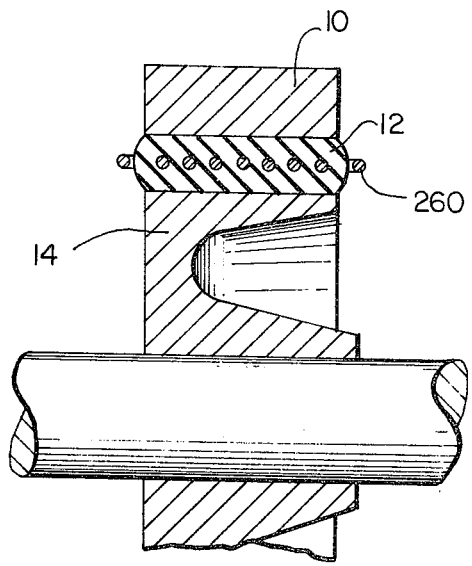
FIG. 4 is a view similar to FIG. 1 and illustrates still another embodiment.

As indicated at FIG. 3 of the drawings, fabric reinforcement 26' may assume the form of an envelope, as in the manner of flattened torus. As indicated at FIG. 4, the fabric may assume the form of a metal mesh 260 whose most lateral warp portions extend beyond the edges of the elastomer 12. In such an embodiment the metal fabric is provided with fill strands which also function to conduct heat away from the elastomer interior. It is not necessary that the outermost metal fabric strands extend beyond the elastomer sides. The reader may readily comprehend that the number of fabric layers, their configuration, and composition may all be varied to suit specific requirements.

What is claimed is:

1. A rotary torsional vibration damper of the type including an outer annular inertia member resiliently coupled to an inner annular hub through an intermediate elastomer member, the hub adapted to be attached to a rotary shaft subject to torsional vibrations, the inertia member adapted to normally execute limited angular oscillations with respect to the hub, the improvement comprising, a fabric reinforcement within and bonded to said elastomer.

2. The damper of claim 1 wherein said elastomer member is annular and said fabric runs circumferentially thereof.

3. The damper of claim 2 wherein said fabric is located at the mean radius of the elastomer.

4. The damper of claim 1 wherein said fabric is cotton, nylon, polyester, rayon glass or metal.

5. The damper of claim 2 wherein said fabric contains warp strands only.

6. The damper of claim 2 wherein said fabric is in the form of a flattened torus to thereby define an envelope in transverse crosssection.

7. The damper of claim 2 wherein said fabric is metal whose edges extend beyond the sides of said elastomer member.

8. The damper of claim 1 wherein said elastomer member is of at least the axial extent of said hub and inertia members.

9. The damper of claim 2 wherein said elastomer member is of at least the axial extent of said hub and inertia members.

* * * * *